(12) United States Patent
Jabusch

(10) Patent No.: US 9,487,184 B2
(45) Date of Patent: Nov. 8, 2016

(54) FORCE LIMITING DEVICE FOR A MOTOR VEHICLE

(75) Inventor: Ronald Jabusch, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 354 days.

(21) Appl. No.: 13/808,372

(22) PCT Filed: Jun. 7, 2011

(86) PCT No.: PCT/EP2011/002775
§ 371 (c)(1),
(2), (4) Date: Feb. 15, 2013

(87) PCT Pub. No.: WO2012/003911
PCT Pub. Date: Jan. 12, 2012

(65) Prior Publication Data
US 2013/0140391 A1 Jun. 6, 2013

(30) Foreign Application Priority Data
Jul. 6, 2010 (DE) .......................... 10 2010 026 285

(51) Int. Cl.
*B60R 22/34* (2006.01)
*B60R 22/28* (2006.01)

(52) U.S. Cl.
CPC ............... *B60R 22/34* (2013.01); *B60R 22/28* (2013.01); *B60R 22/341* (2013.01); *B60R 2022/288* (2013.01)

(58) Field of Classification Search
CPC ....... F16H 33/14; F16H 33/16; F16H 33/185
USPC ..................... 242/383.2, 383.3, 384.2, 384.3
See application file for complete search history.

(56) References Cited

U.S. PATENT DOCUMENTS

| 1,551,695 | A | * | 9/1925 | Reece | ..................... F16H 33/16 475/112 |
| 2,139,301 | A | * | 12/1938 | Davey | ..................... F16H 33/16 475/112 |

(Continued)

FOREIGN PATENT DOCUMENTS

| DE | 202 07 276 U1 | 10/2002 |
| DE | 10 2005 016 822 B3 | 1/2007 |

(Continued)

OTHER PUBLICATIONS

PCT International Search Report—Sep. 13, 2011.

(Continued)

*Primary Examiner* — Emmanuel M Marcelo
*Assistant Examiner* — Justin Stefanon
(74) *Attorney, Agent, or Firm* — Brinks Gilson & Lione

(57) ABSTRACT

A force limiting device for a motor vehicle, which features at least two parts controlled relative to each other with a frequency-based, defined movement, wherein the parts moving relative to each other have mutually engaging gearings and the frequency-controlled movement takes place in such a way that at least one of the parts performs a wave-like advancing motion with respect to another part, in which the gearing is alternately engaged and disengaged, wherein one or a plurality of individual masses are provided, which can be coupled to or decoupled from the part performing the wave-shaped advancing movement thereby changing the force limiting characteristics of the system.

14 Claims, 2 Drawing Sheets

(56) References Cited

U.S. PATENT DOCUMENTS

| | | | |
|---|---|---|---|
| 2,984,124 A * | 5/1961 | Keyser | F16H 33/14 |
| | | | 475/255 |
| 4,206,887 A | 6/1980 | de Rosa | |
| 4,483,494 A | 11/1984 | Takada | |
| 4,749,142 A * | 6/1988 | Saitow | 242/382.2 |
| 4,943,011 A | 7/1990 | Kitamura et al. | |
| 5,297,752 A | 3/1994 | Brown et al. | |
| 5,601,251 A | 2/1997 | Hishon et al. | |
| 5,636,806 A | 6/1997 | Sayles | |
| 5,769,345 A | 6/1998 | Morner et al. | |
| 6,098,772 A | 8/2000 | Kimmig et al. | |
| 6,260,782 B1 | 7/2001 | Smithson et al. | |
| 6,409,115 B1 | 6/2002 | Specht et al. | |
| 6,443,382 B1 | 9/2002 | Bae | |
| 6,454,201 B1 | 9/2002 | Strobel et al. | |
| 6,871,813 B2 | 3/2005 | Bae | |
| 6,932,324 B2 | 8/2005 | Biller et al. | |
| 7,210,645 B2 * | 5/2007 | Paterson et al. | 242/383.4 |
| 7,631,830 B2 * | 12/2009 | Boelstler et al. | 242/374 |
| 7,980,503 B2 * | 7/2011 | Saito et al. | 242/382.1 |
| 8,529,398 B2 | 9/2013 | Jabusch | |
| 2002/0190515 A1 | 12/2002 | Birk et al. | |
| 2005/0059524 A1 | 3/2005 | Hori et al. | |
| 2005/0133330 A1 | 6/2005 | Stiefvater | |
| 2008/0105778 A1 * | 5/2008 | Benner | 242/382.2 |
| 2008/0191083 A1 * | 8/2008 | Sumiyashiki | 242/382.2 |

FOREIGN PATENT DOCUMENTS

| | | |
|---|---|---|
| DE | 10 2008 049 931 A1 | 5/2010 |
| DE | 10 2009 010 435 A1 | 9/2010 |
| FR | 2 528 928 A1 | 12/1983 |
| WO | WO 03/020557 A1 | 3/2003 |
| WO | 2004/096611 A1 | 11/2004 |
| WO | WO 2006/108451 A1 | 10/2006 |
| WO | 2007/130041 A1 | 11/2007 |
| WO | WO 2010/037460 A2 | 4/2010 |
| WO | WO 2010/139433 A1 | 12/2010 |

OTHER PUBLICATIONS

German Search Report—Feb. 2, 2011.

* cited by examiner

FORCE LIMITING DEVICE FOR A MOTOR VEHICLE

CROSS-REFERENCE TO RELATED APPLICATIONS

This application claims priority to German Patent Application No. 10 2010 026 285.4, filed Jul. 6, 2012 and PCT/EP2011/002775, filed Jun. 7, 2011.

FIELD OF THE INVENTION

The invention relates to a force limiting device for a motor vehicle belt restraint system.

BACKGROUND OF THE INVENTION

Force limiting devices are known in general from various applications in motor vehicles. Steering wheels are known, for example, which collapse in case of a crash due to the impact with the seat occupant, and have a device for energy absorption, by means of which a force acting on the vehicle occupant is limited. Flexible deformation elements are furthermore provided in the entire vehicle body structure, so that energy is absorbed in the event of a crash, so that the force acting on the passenger compartment is limited.

It is furthermore known from the prior art to provide force limiting elements in the safety belts, so that the force acting on passengers in a crash due to forward displacement is limited by the force limiting device. Two-part belt shafts with a torsion rod arranged between the two parts of the belt shaft have proven useful in the practice. In case of a crash, one part of the belt shaft is locked with respect to the vehicle, while the other part is attached to the safety belt and rotates in the belt extension direction. During the relative rotation of the two parts to each other, the torsion rod arranged between the two parts is plastically deformed about its own axis in an energy consuming manner, so that the force in the safety belt during the forward displacement of the passenger is limited accordingly. The amount of force limiting is determined by the torsion rod and cannot be varied.

An innovative, frequency-controlled force limiting system is known from patent publication WO 2006/108451 A1 of the applicant. The force limiting system described therein consists of two parts moving with respect to each other, whose movement with respect to each other is controlled by a mass system caused to vibrate or oscillate at a defined frequency. The nullification of the energy takes place in that the parts are alternately decelerated and accelerated, wherein the frequency is essentially independent of the applied force. Different force limiting levels can therefore be attained with this force limiting system as a function of the mass of the moving parts and of the momentum occurring in case of a vehicle impact, wherein the frequency and the path of the forward displacement are approximately constant.

From WO 2010/037460 A2 is known further development of the force limiting system described therein, in which the force-limited forward displacement of the passenger is made possible in that a part is provided which engages in a gearing of another part and performs a wave-like forward movement in which the gearing is alternately engaged and disengaged.

The characteristic of the force limiting curve in a system of this kind can be changed by the geometry of the gearing and by the mass of the moving parts. The force limiting characteristic basically can no longer be changed after the part having the gearing has been produced.

SUMMARY OF THE INVENTION

It is an object of the invention to improve a generic force limiting device of the kind described above in such a way that the force limiting characteristic can be varied by the simplest possible means, even after production of the interacting parts. This object is attained according to the invention by means of a force limiting device with the features of this invention.

In accordance with the basic idea of the present invention, it is proposed to provide one or a plurality of individual masses, which are coupled or can be coupled to the part carrying out the wave-like advancing movement. The mass of the part performing the advancing movement can still be changed subsequently by means of the individual masses, so that the force limiting characteristic can subsequently still be adapted to the individual vehicle. It is accordingly possible to design the force limiting device in such a way that the force limiting characteristic has a specific basic level and/or a basic profile, which can be the force limiting characteristic for the greatest possible number of motor vehicles or motor vehicle types. If this basic level and/or the basic profile is not appropriate for the individual type of motor vehicle, the individual application point in the vehicle, or the individual passenger to be restrained, the force limiting characteristic can be changed by means of the individual masses, wherein in particular the number of individual masses and their mass thereof are available as additional parameters for fine tuning of the force limiting characteristic.

BRIEF DESCRIPTION OF THE DRAWINGS

The invention will be described in greater detail below with reference to one exemplary embodiment. The following details can be seen in the figures, wherein.

DETAILED DESCRIPTION OF THE INVENTION

Figure 1:
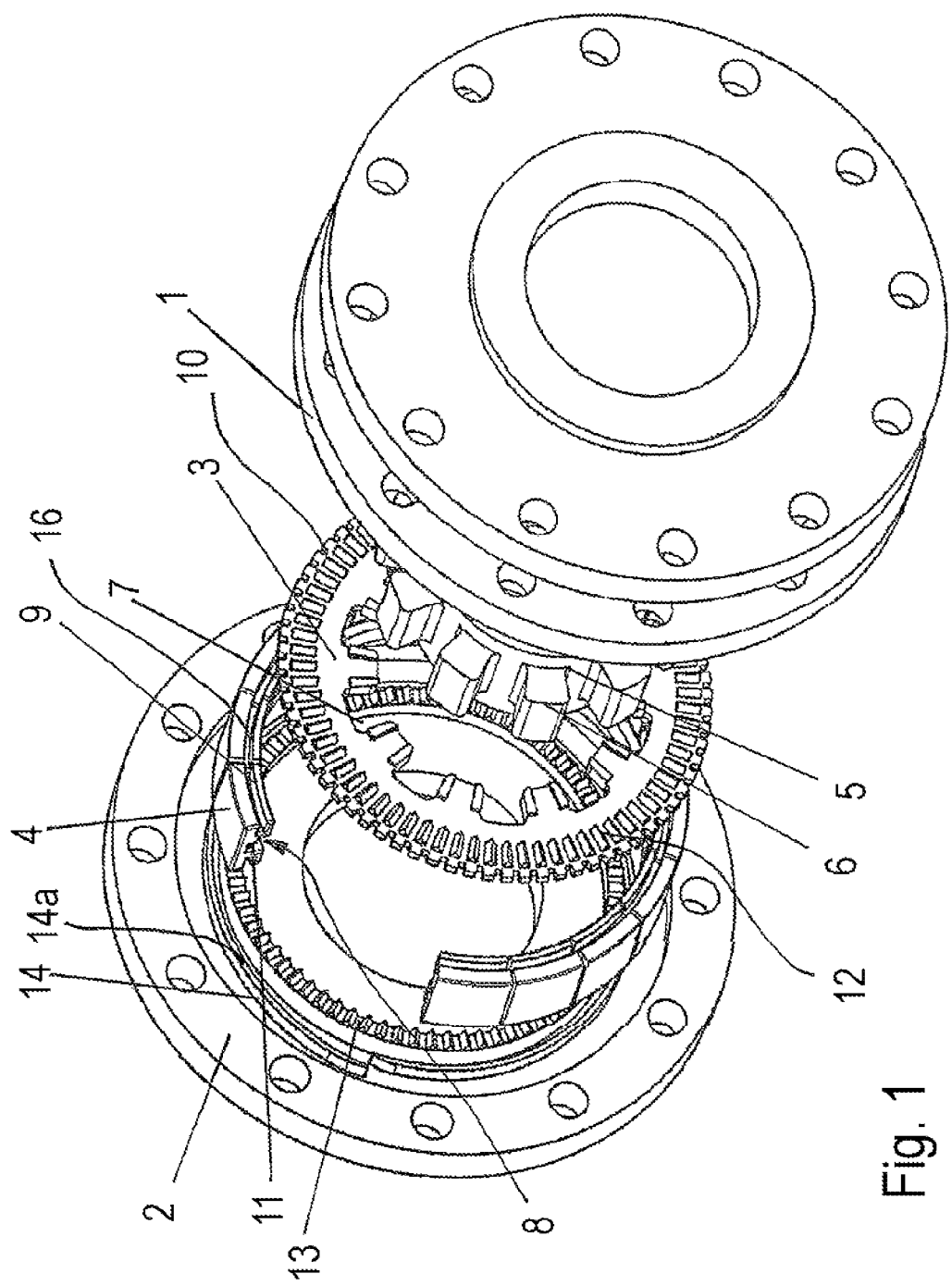
FIG. 1 shows a force limiting device according to the invention, in exploded representation.

FIG. 1 shows a force limiting device according to the invention for a safety belt system of a motor vehicle. The force limiting device can be coupled by means of minor constructive adaptations to the shaft of a belt retractor, the anchor of a belt lock, or also an end stop of a safety belt system. Regardless of the location of attachment to the safety belt system, the force limiting device allows a force-limited extension of the safety belt to reduce the stress acting on the passengers. The use of the force limiting device is furthermore also possible within the structure of the vehicle itself or on another part of the vehicle when a defined force limiting deformation is to be made possible.

The force limiting device is composed of three parts 1, 2 and 3 in this embodiment, wherein the parts 1 and 2 are of a fixed design, and also can be considered to be the housing of the force limiting device. The part 3 is designed as a disk plate with two lateral gearing 12 formed by teeth, of which only the part 1 facing the gearing 12 is shown. The disk plate 13 is furthermore equipped with a radially inwardly directed gearing 7 and an outwardly directed gearing 10. A drive wheel 5 is provided with a gearing 6, which is complementary to the gearing 7 and can be connected, for example, in a torque-coupling manner to a belt shaft in order to activate the force limiting device. The fixed parts 1 and 2 are likewise equipped with lateral, axially directed gearings 13 formed by teeth, wherein only the gearing 13 on the part 2 is visible based on the illustration. The gearing 13 and the axially directed (not illustrated) gearing located on the part 1 are shaped in such a way that they engage in the lateral gearing 12 and the gearing, which is not visible, engages in the part 3, that is, the tooth spacing and the tooth depth of the gearing 12 and 13 and/or of the gearing, which is not illustrated, are selected such that a continuously alternating engagement motion of the gearings is possible.

The parts 1 and 2 are dimensioned in such a way that the gearing 13 of part 2 and the not illustrated axially directed gearing on the part 1 have a spacing with respect to each other which enables a lateral oscillating movement of the part 3 located between them after the assembly of the force limiting device. As a result of the free play in the axial direction, which is intentionally adjusted as a result of the design, the part 3 is always engaged with the gearing 12 of the part 2 or with the gearing on the part 1, which is not illustrated. Upon driving the part 3 in circumferential direction by means of the drive wheel 5, the part 3 carries out the wave-like forward motion caused according to the invention due to engaging in the gearing 12 and in the not illustrated gearing, whereas the part 3 is alternately decelerated and accelerated laterally. The wave-like forward movement of the part 3 is formed by a rotational movement defined by the rotational movement of the drive wheel 5 and a wave-like axial movement directed transversely to the rotational direction of the rotational motion, which is defined by the alternating engagement of the axially directed gearing 13. The motion sequence corresponds insofar to that of the force limiting device of WO 2010/037460 A2 which is incorporated by reference.

Figure 2:
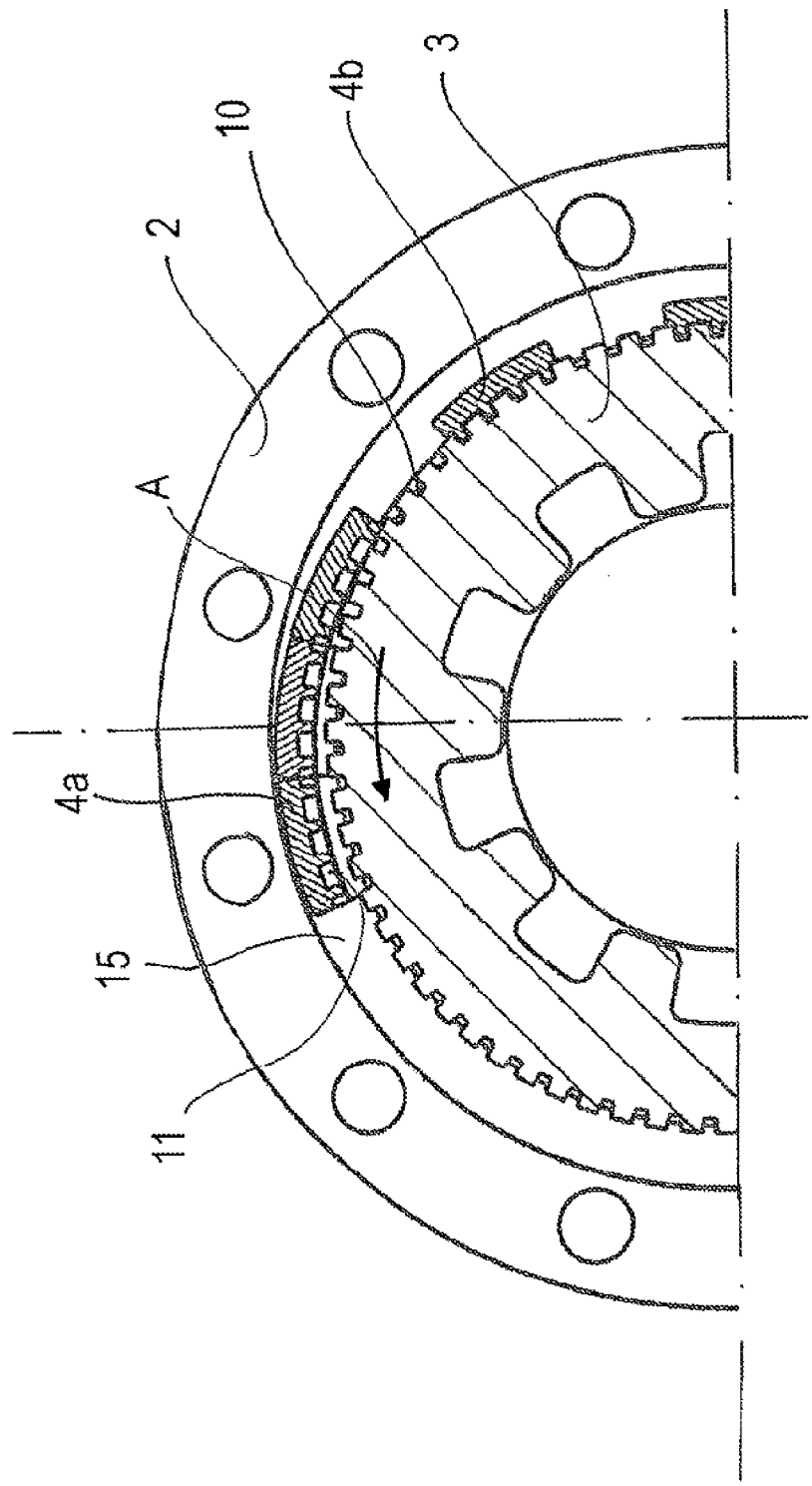
FIG. 2 shows the force limiting device of FIG. 1 with individual masses coupled to a disk plate with external gearing.

In accordance with the proposed further development, and as is also evident in FIG. 2, a radially outwardly directed gearing 10 formed by teeth is additionally provided transversely with respect to the rotational movement on the part 3. A plurality of individual masses 4, 4a and 4b having a radial groove 8 facing the part 3 are furthermore provided, in which a gearing 11 formed by teeth is likewise provided, whose geometry is selected in such a way that the gearing 11 can engage in the gearing 10.

After an activation of the force limiting device, the individual masses 4, 4a and 4b are taken along by means of the mutually engaged gearing 10 and 11 and laterally by means of the part 3 engaged in the groove 8, so that the individual masses 4, 4a and 4b in the position coupled to the part 3 likewise carry out the wave-like advancing movement. Due to the selection of the number and mass of the individual masses 4, 4a and 4b, the force limiting characteristic can be individually changed without having to make a design change to the force limiting device per se. A force limiting device is accordingly created, whose force limiting characteristic can be changed as desired with a very small design effort, without the design of the basic elements themselves having to be changed.

The force limiting device is moreover equipped with a device 14 in the form of a ramp-shaped control contour, which is arranged on the part 2 in a section, which is radially outwardly arranged with respect to the gearing 13. The control contour runs in a circumferential direction and increases radially outward. The control contour is equipped with an axially protruding lug 14a, which features an essentially constant thickness and engages in a groove 9 located to the side of the individual masses 4, 4a and 4b. The lug 14a extends laterally from the control contour and has a spiral-shaped profile with a distance to the rotational axis of part 3 that increases in the rotational direction of arrow A.

With a rotation of part 3 in the direction of arrow A, the individual masses 4, 4a and 4b are additionally guided and carry out a controlled movement by means of which they become disengaged from the part 2 upon reaching a predetermined rotational position. As is evident in FIG. 2, one individual mass 4a is already in a position in which it no longer engages in the gearing 10 with its gearing 11; the individual mass 4a is consequently no longer engaged in the part 3. The individual mass 4b, however, is still located in a position in which the gearing 11 and 10 engage with each other, so that the individual mass 4b can be considered to be engaged with the part 3. After an additional rotation of the part 3 with respect to part 2, the individual masses 4, 4a and 4b are disengaged one after the other by means of a movement of part 3 defined by the control contour and/or the laterally protruding lug 14a, so that the entire mass of the part carrying out the advancing movement, which is formed by the sum of the masses of part 3 and of the engaged individual masses 4, 4a and 4b, can be considered as decreasing. A free space 15 arranged radially outward to the moved part 3 is provided to accommodate the disengaged individual masses 4, 4a and 4b. The free space 15 should be dimensioned in such a way that it allows a movement of the individual masses 4, 4a and 4a radially outward by at least the depth of the gearings 10 and 11, so that the gearings 10 and 11 are no longer engaged in the disengaged position.

The force limiting characteristic of the force limiting device diminishes as a result of the decreasing total mass, that is, the amount of force limiting decreases if the speed of the part 3 remains constant. An opposite effect can be realized by means of a coupling of the individual masses 4, 4a and 4b during the rotational movement and a consequent increase of the total mass.

While the above description constitutes the preferred embodiment of the present invention, it will be appreciated that the invention is susceptible to modification, variation and change without departing from the proper scope and fair meaning of the accompanying claims.

The invention claimed is:

1. A load limiting device for a motor vehicle comprising at least two parts which are controlled relatively to each other by means of a movement defined by a frequency, wherein the at least two parts moving relatively to each other each form meshing teeth and the movement defined by a frequency is effected by at least one of the at least two parts performing a wavelike feed motion relative to another of the at least two parts, during which feed motion the teeth of the at least two parts alternately engage and disengage, further comprising one or more masses, which are coupled to one of the at least two parts performing the wavelike feed motion in a coupled state, in which the one or more masses move with the one of the at least two parts in the wave-like feed motion, the one or more masses being uncoupled from the one of the at least two parts in an uncoupled state, in which a smaller total mass moves in the wave-like feed motion than in the coupled state, wherein at least one of the one or more masses is configured to move from one of the coupled state and the uncoupled state to the other one the coupled state and the uncoupled state during the feed motion, thereby changing the frequency, wherein the one of the at least two parts being coupled to a seat belt restraint system retractor for providing load limiting force control for the seat belt restraint system retractor.

2. The load limiting device according to claim 1, further comprising that the device for coupling or decoupling the masses is formed by a control contour which is located on the one of the at least two parts, relative to which the one of the at least two parts performing the wavelike feed motion performs the movement, and with which the one or more masses engage.

3. The load limiting device according to claim 2, further comprising that the one or more masses form a guiding groove, into which the control contour extends.

4. The load limiting device according to claim 1, further comprising that the part of the at least two parts performing the wavelike feed motion form first teeth which are directed crosswise to the feed direction, and that at least one of the masses form second teeth engaging with the first teeth.

5. The load limiting device according to claim 4, further comprising that the masses comprise a groove, in which the second teeth are located.

6. The load limiting device according to claim 1, further comprising that adjacent to the one of the at least two parts performing the wavelike feed motion a free space is provided, in which the masses can be accommodated in a position decoupled from the one of the at least two parts.

7. A load limiting device for a motor vehicle seat belt restraint system comprising at least two parts each forming meshing teeth which rotate relative to each other about a rotational axis in a manner defined by a frequency when a torsional force is applied, one of the at least two parts being coupled to the seat belt restraint system retractor for providing load limiting force control for the seat belt restraint system retractor and performing a wavelike feed rotational motion about the rotational axis and an axial motion along the rotational axis relative to another and during which feed motion the teeth of the at least two parts alternately engage and disengage, further comprising at least one mass, which is coupled to one of the at least two parts performing the wavelike feed motion in a coupled state, in which the at least one mass moves with the one of the at least two parts in the wave-like feed motion, the at least one mass being uncoupled from the one of the at least two parts in an uncoupled state, in which a smaller total mass moves in the wave-like feed motion than in the coupled state, wherein at least one of the one or more masses are configured to move from one of the coupled state and the uncoupled state to the other one the coupled state and the uncoupled state during the feed motion, thereby changing the frequency of the wavelike rotational and axial motion.

8. The load limiting device according to claim 7, further comprising a device, which couples the at least one mass to the one of the at least two parts in a first portion of the feed motion and decouples at least one mass of the at least one mass from one of the at least two parts during a second portion of the feed motion.

9. The load limiting device according to claim 8, further comprising that the device for coupling or decoupling the at least one mass is formed by a control contour which is located on the one of the at least two parts, relative to which the other one of the at least two parts performing the wavelike feed motion performs the movement, with which the mass engages.

10. The load limiting device according to claim 9, further comprising that the mass forming a guiding groove, into which the control contour extends.

11. The load limiting device according to claim 8 further comprising that adjacent to the one of the at least two parts performing the wavelike feed motion a free space is provided, in which the mass can be accommodated in a position decoupled from the at least one part in the second portion of the feed motion.

12. The load limiting device according to claim 7 further comprising that the part performing the wavelike feed motion forms first teeth which are directed crosswise to the feed direction, and the mass forms second teeth which engage with the first teeth.

13. The load limiting device according to claim 12, further comprising that the mass forms a groove, in which the second teeth are located.

14. The load limiting device according to claim 7 further comprising at least two of the at least one mass.

* * * * *